United States Patent Office 3,422,007
Patented Jan. 14, 1969

3,422,007
WASTE TREATMENT PROCESS
Francis J. Larkin, 1707 N. 78th Ave.,
Elmwood Park, Ill. 60635
No Drawing. Filed Oct. 22, 1965, Ser. No. 502,354
U.S. Cl. 210—7                  8 Claims
Int. Cl. B03b 7/00

ABSTRACT OF THE DISCLOSURE

A method for treatment of waste materials such as sewage comprising side by side settling and aeration zones with a common boundary therebetween and having the bottom of the settling zone elevationally higher than the bottom of the aeration zone and having upper and lower communication links between the zones, the lower communication link for return of sludge being below the bottom of the common boundary. Sludge settling adjacent the bottom of the common boundary is moved intermittently on a preestablished time cycle in response to a positive thrust biased in the direction of the aeration tank by means moving in the lower communication link whereby sludge is swept beneath the common wall into the aeration zone.

---

This invention relates to a process for the treatment of waste materials. More particularly, it relates to an activated sludge type treatment of sewage and industrial waste. Still more particularly, it relates to an activated sludge process wherein the sludge is limited to a definite short time of settling and then moved directly from the settling zone by means providing for submerged introduction to a zone of complete mixing and aeration and to apparatus for accomplishing the processing of sewage.

In accordance with this invention, a method of treating sewage and industrial waste to accomplish high removal of Biochemical Oxygen Demand (B.O.D.), is provided. The method involves aeration and settling operations wherein oxygen is dispersed in the mixed liquor in quantities to satisfy a substantial portion of the B.O.D. by mechanical means which takes air directly from the atmosphere and disperses it in bubble form in the liquid medium and the settling operation is of the type wherein sludge is limited to a short residence time by a scraper unit which traverses the width of the settling zone on a periodic cycle and forces the settled sludge down an inclined plane which forms the settling zone bottom and extends under a baffle separating the aeration and settling zones and into the ateration zone as a shelf capable of acting as a guide for directing recycle of a concentrated sludge into the aeration zone.

In the treatment of waste materials by the activated sludge system, the completeness of B.O.D. removal is dependent upon the minimum time of treatment, the minimum level of dissolved oxygen being maintained in dispersed form in the mixed liquor, the quantity of sludge being recycled, the condition of the recycled sludge and the concentration of solids in the mixed liquor which is controllable, at least in part, by the amount of sludge wasted from the system.

Basic problems in the activated sludge type system are the complexity and size of the system required for efficient operation and for maintaining the sludge in a highly active condition through continuous intimate contact with oxygen.

Plants for the treatment of aqueous wastes of a size for the treatment of sewage from individual installations where the number of people involved is limited, for example, 25 to 1,000, have not been looked upon with favor because the scaled-down versions of conventional activated treatment type plants have been exorbitantly expensive per unit of capacity to build, to maintain and to operate because scaled-down plants have not been reduced in functional components, in the need for trained operators, in the relatively high power cost, and the like.

Another serious problem has been sludge handling. Sludge contains aerobic organisms which only develop in the mixed liquor in an aeration zone where there is an adequate supply of nutrients and oxygen at all times. When the mixed liquor passes from the aeration zone to a settling zone, the sludge settles at the bottom of the settling zone wherein anaerobic conditions can develop due to depletion of the dissolved oxygen content of the liquid. If held too long under the anaerobic conditions, the organisms undergo a transformation after which it is difficult to restore their previous active condition and they become realtively ineffective in the propogation of the reaction whereby B.O.D. is removed.

In addition, an activated sludge plant's sludge is generally collected in flat bottom settling tanks provided with various types of equipment to move the sludge to a sludge collecting zone and a pumping system such as an air lift for removing the sludge from the collecting zone of the settling tank so that it can be returned to the aeration zone. If the collecting and removal of sludge is not properly sequenced, appreciable portions of sludge can remain in a final tank for a sufficient time to become septic in which condition the sludge is difficult to settle and in floating interferes with the settling operation.

Where there is no central sewage treatment plant, it is necessary to install septic tanks or other means to handle the sewage and other waste materials on a small quantity basis. While such septic tanks can handle minor amounts of waste products, the waste materials must be allowed to remain in the septic tank for a considerable length of time so that an anaerobic decomposition of the waste material occurs. The length of time required for such anaerobic decomposition limits the quantities of material which can be handled and with fluctuating loads may pass effluent which still contains harmful matter.

Now it has been discovered that an efficient economical and practical waste treating system which is more efficient than the septic tank process and does not need expensive underground tile fields or other arrangements for effluent disposal and which at the same time can be manufactured in a variety of small sizes and installed at a reasonable cost due to the processing unit being simplified to require actuation by, for example, as few as two electric motors for the continuous operation of the integrated aeration and settling steps. This waste treatment process provides mixing with proper amounts of recycle sludge whose aerobic character remains unaltered due to the fact that the residence time in the settling zone has been limited to less than an hour, the exact residence generally depending upon the size of the settling tank and, preferably, being limited to about 10 minutes to 20 minutes.

The method of this invention for treating aqueous waste material comprises establishing side-by-side aeration and settling zones with a common wall therebetween. The bottom of said settling zone is positioned above the bottom of said aeration zone, and has said zones communicating in two locations through said common wall below the normal liquid levels prevailing in said zones. The first of these communications between zones is in the upper portion of said zones and provides for transfer of liquid from the aeration zone to the settling zone. The second of these communications between zones is immediately above the bottom of said settling zone and provides for transfer of fluid material from said settling zone to said aeration zone. The second communication is formed between the bottom of the common wall and an extension of the bottom of said settling zone sloping in the direction of the aeration zone so as to provide a longitudinal trough whose lowest point within the settling zone is adjacent said common wall. In the aeration zone there is established a mixture of waste material and sludge. This mixture is mechanical mixed with atmospheric air in quantities sufficient to satisfy a major portion of the B.O.D. of the mixture. Treated mixture, discharged through said baffled ports to the settling zone, separates into a clarified liquid and a concentrated sludge. The sludge settling at the bottom of said settling zone is conveyed to said aeration zone through said second communication by the action of scraper means which moves the sludge from any area of deposition on a time cycle of at least once in each pre-established period. Clarified liquid in the upper portions of said settling zone is discharged to waste over a suitable weir or by other suitable means.

The apparatus designed for carrying out the above process for treating waste material comprises a tank having one side wall offset laterally intermediate its length with the upper portion of said wall spaced outwardly relative to the lower portion thereof. These offset walls are joined by an offset wall portion sloping downwardly from the lower edge of the upper wall portion to the upper edge of the lower wall portion. The tank itself is divided into aeration and settling compartments by a substantially vertical baffle extending upwardly from a point adjacent said sloping wall portion in a position generally intermediate the vertical axes of said upper and lower portions of said side wall of said tank. The vertical baffle has the bottom thereof spaced from said sloping portion of said wall a distance providing a predetermined clearance, i.e., a distance which permits a scraper to pass underneath said baffle while approaching close to but not touching the baffle. Aqueous waste material to be treated in said aeration compartment is supplied thereto through suitable conduit means or conduit channels or equivalent means. Centrally located in said aeration compartment is a unit for mechanically mixing atmospheric air with liquid material in said aeration compartment. Generally, this mechanical mixer has the unit for discharging liquid-air mixture radially, positioned below the normal liquid level of said compartment and in the upper portion thereof, although with special bottom arrangements for the aeration compartment, the mechanical mixer may be extended to a position adjacent the bottom of said compartment.

Aerated mixture is discharged from said aeration zone to said settling zone through a liquid communication means such as a baffled port. Sludge concentrating in the bottom of this settling compartment is moved from its original point of deposition by scraper means of a length to extend along a part of said sloping offset wall and at least to the aeration side of said baffle and of a height clearing the bottom of said baffle. This scraper means acting on the sludge accumulating adjacent said sloping bottom of said settling compartment sweeps it underneath the baffle wall and causes the sludge to slide down the extension of the slanted bottom of said settling compartment to a drop off point where it will be picked up by the circulating liquid in the aeration compartment. Any excess of sludge over that required to maintain the solids concentration of the aeration compartment is discharged to waste through suitable means such as a valved conduit communicating with the sloping bottom of said settling compartment. Clarified liquid accumulated at the upper portion of the settling compartment is discharged by suitable means, such as a weir or equivalent conduit means.

In carrying out such a process, aqueous wastes are processed in plants which give highly efficient aerobic treatment and flexibility to accommodate a wide range of daily flow due to simplicity of design, by combining an aeration zone in which the tank contents are maintained aerated and in circulation by a rotor member located below the liquid level in the aeration zone, said rotor element being adapted to create cavitation and to bring air from the atmosphere to the cavitation zone where it can be mixed with liquid by the rotor element and a mixture of liquid medium and dispersed bubbles of air discharged to the surrounding aeration zone contents, with a settling zone, the lowest point of which adjoins a relatively small unobstructed opening into the side of said aeration zone at a point appreciably above the bottom of said aeration zone, said settling zone having the bottom thereof formed as an inclined plane slanting downwardly to the unobstructed opening and having an extension of the inclined plane forming the bottom of said opening and extending into the aeration tank to form a shelf protecting the opening against eddy currents which could interfere with movement of sludge through said opening. The settling zone is provided with traveling scraper mean operating in the longitudinally directed trough bottom of the settling zone or compartment and generally extending through said opening and along the shelf, capable of forcing movement of the concentrate of sludge down the inclined plane to the point of mixing with circulating aeration tank contents.

More in detail, in one mode of operation, the process of treating sewage comprises introducing sewage, the insoluble solids of which are usually in comminuted form, into an aeration zone in one of two contiguous zones or tanks. The B.O.D. removal to be achieved will be in the range between about 70% and 95%. Sewage is introduced into the aeration zone and mechanical aeration effected on a continuous basis to maintain an oxygen content in the mixed liquor in the aeration zone of at least 3 p.p.m. and preferably in the range between about 4 and 6 p.p.m. B.O.D. loading of the aeration zone is generally in the range between about 100 pounds and 300 pounds of B.O.D. per 1000 cubic feet of aeration zone volume, although the loading may be higher.

Sewage may be introduced into the aeration zone by any suitable means such as by overflowing a weir. Liquid medium is transferred from the aeration zone to the settling zone by suitable means such as a baffled aperture or apertures in the wall between the aeration zone and the settling zone.

The settling zone is bounded on one side by the wall separating the aeration and settling zone which extends downwardly to an opening such as a relatively narrow slot. The bottom of this slot is an extension of the inclined bottom of the settling zone which is slanted downwardly so that the low point of the settling zone is adjacent the slot. This slanting bottom may vary in angle from about 30 to 70 degrees from the horizontal.

Aerated mixture is introduced into this type settling tank generally, a substantial distance below the liquid surface so that the settling zone will act as an upflow clarifier with sludge accumulating in the longitudinally extending trough bottom and clarified liquid overflowing a weir or other suitable means positioned adjacent the liquid surface for removal of liquid.

In order to insure maintenance of a proper concentration of solids in the aeration tank, sludge is returned from the settling tank in amounts varying usually from about 50% to 500% by volume based upon the incoming flow of raw sewage to the aeration compartment. Partial control of the amount of sludge returned is provided by withdrawal of quantities of concentrated sludge to waste which are in excess of that required to insure maintenance of the predetermined B.O.D.-solids ratio in the aeration zone.

To provide for continuous movement of sludge having a maximum residence time in the settling zone of, for example, thirty minutes, from the settling zone to the aeration zone, a scraper unit is provided to move the sludge incrementally from all portions of the settling zone by a scraper adapted to move longitudinally at a rate generally of 1 to 5 feet per minute, back and forth over a distance generally of about 5 to 25 feet of the length of the settling zone, a rate which does not stir up the sludge in a manner interfering with the settling operation. If the settling zone has a length greater than about 25 feet, a multiplicity of scraper unit should cycle back and forth at a rate to insludge removal units are utilized, each to reciprocate back and forth over a fixed length of the settling zone. Each scraper unit should cycle back and forth at a rate ot insure that each portion of the slanting floor of the settling zone is swept at least once every 15 to 30 minutes.

Apparatus for carrying out the process consists of a tank of suitable construction such as concrete or steel. Sewage is introduced into the tank through an influent channel which permits flow into the tank over, for example, a weir. The tank is divided into an aeration compartment and a settling compartment by a common wall or baffle.

Aeration in the tank is effected by introduction of air by mechanical means. This mechanical aerating means comprises a motor supported above the liquid level of the tank by suitable means such as spaced beam members resting for support on the end walls of the tank and a cross support plate. The motor drives a rotatable hollow shaft extending downwardly to a point below the liquid level in the tank which may be directly driven or indirectly driven through a belt and pulley arrangement. Such a shaft has at its lower end blades which extend radially from the shaft. The hollow shaft is open to the atmosphere at its upper end and open to a cavitation zone at its lower end.

Secured to the lower side of the plate by suitable means, such as a flange, is a tube which surrounds and extends substantially the length of the hollow shaft and provides a liquid tight enclosure for the shaft. A lower end bearing journals the shaft within the tube.

This tube has secured to its lower end a circumferentially flanged plate provided with an annular opening which automatically permit flow of liquid to the blade area. Below the plate is a plate secured in the spaced position by a plurality of spacing members. The spacing members may be threaded members which are secured to the plates by nuts or other suitable means.

Due to the action of the aerating means, liquid and air are mixed in the cavitation zone between the plates and discharged horizontally into the main body of liquid in the tank. Of course, other arrangements are possible to alter the pattern of liquid circulation in the tank.

The baffle which divides the tank is provided with an upper opening which is somewhat below the liquid level of the aeration compartment and also below the liquid level in the settling compartment. This provides a first communication link between the aeration and settling comparments. This opening or port is provided with suitable means such as a baffle to provide a circuitous flow path and to eliminate turbulence from the liquid passing from the aeration compartment to the settling compartment.

The settling compartment is provided with end walls, a sidewall and an inclined bottom wall which usually has a portion extending into the aeration tank as a shelf. The sidewall is adapted with one or more ports or other suitable means for discharge of effluent to a suitable receiving body.

The end walls are adapted to support a beam or rail member. This beam member supports a suitable moving member for scraper means operating adjacent the bottom of the settling compartment. A power source, such as an electric motor, is secured to and supported on a bracket which is fixed to and supported by one end of the beam member. Also supported on the bracket is a conventional gear reduction unit. The drive shaft of the motor is connected by a suitable coupling to the input shaft of the gear reduction unit. The gear reduction unit has an output shaft upon which is mounted a sprocket wheel.

The beam member, at its end removed from the gear reduction unit has mounted thereon a bracket for support of a bearing assembly in which is journaled a shaft. This shaft has splined thereto an idler sprocket wheel. An endless chain is trained over the sprocketed wheels and has the ends thereof pivotally connected to a pin supported by the moving member or trolley. An electric motor, which drives the actuating chain, may be of the reversing type whose rotation in each direction is controlled by limit switches, but, if desired, mechanical means for periodic reversal of direction of movement of the chain may also be used.

The trolley includes a frame of a U-shaped cross section having a bottom which is disposed beneath the beam member and sides which straddle and are spaced from said beam member. Each side supports inwardly extending axles with journals adjacent each end thereof. These axles support flanged wheels. The flanged wheels straddle the web of beam member and rest upon the bottom flange. Thus, the trolley is supported for free travel adjacent the common wall or baffle. Ears on the sides of the trolley which extend above the top of the beam member are adapted to support a pin to which the ends of the chain are secured.

A rigid shaft is supported by the trolley in a position suspended below the beam member. This shaft supports scraper means at the lower end thereof positioned adjacent the inclined bottom wall.

Such scraper means is of a length to scrape an appreciable length of the bottom of the tank in the vicinity of the common wall which terminates short of the inclined bottom to form a slot or a second communication link between the aeration and settling compartments. The scraper means extends a length usually adapting it to pass through the slot and along at least part of the extension or lip. Preferably, the scraper means has concave sides so that sludge is subjected to a plowing effect and the cross-sectional thickness is such that there is only a slight clearance with the bottom of the wall so that plowed sludge is directed through the slot and out of the settling compartment and any tendency to agglomerate and to plug the slot is prevented.

In another embodiment of the invention, the beam member which supports the trolley member is positioned on the aeration tank side and adjacent to the common wall. Depending from the trolley member is a shaft having its lower end engaging scraper means in a configuration to allow pivoting of the scraper means in a plane parallel to the inclined bottom of the tank.

The scraper means is of a length to scrape the lip, the floor of the slot and an appreciable length of the bottom of the settling compartment in the vicinity of the common wall. This scraper means is formed as a bolted assembly of triangular-shaped plates having adjacent confronting faces provided with matching grooves arranged so that when the plates are joined together, the scraper has an internal socket, a central feed bore leading into the socket and branch bores leading from the socket and terminating at ports at opposite sides of the scraper. The socket receives a pivotally mounted swing valve which is provided with a vertical stem that projects upwardly of the scraper.

The upper scraper plate is provided with an upstanding post that terminates in suitable connector means permitting pivotal action such as a swivel ball which is received within the lower end of the shaft to mount the scraper for pivoting movement about the axis of the post. The upper plate is also provided with a connector nipple externally threaded to receive a fitting on the end of an air hose. The nipple communicates with the end of the central feed bore.

The air hose is trained along the shaft by any suitable securing facilities. Finally, a fixed arm is mounted on the lower end of the shaft and pivotally mounts one end of a swing link that has its opposite end fixed to the stem of the swing valve to rotate it in accordance with the movement of the swing link.

When this scraper approaches the end of its travel in either direction, the end of the wide side of the scraper contacts the end wall causing the scraper to pivot bodily about the axis determined by the post. This bodily pivoting action causes the valve to shift, thus shutting off air from the branch directed to the side of the scraper facing in the direction of post travel and introducing air to the branch directed to the side of the scraper facing in the reverse direction of travel.

In a further embodiment of the invention, the aeration compartment may be adapted with a mechanical aerator differing from that described previously only in that it extends to adjacent the bottom of the compartment.

In still another embodiment of the invention, particularly useful in steel fabricated tanks when air under pressure is available, an aeration compartment is adapted with sloping bottom walls. The low point of these walls terminates at the edge of a sump. Such a sump is provided with one or more ports for drainage and is adapted to receive suitable closure means, such as plugs. Mounted within the sump is gas introducing means, such as a coarse bubble disperser. This disperser means is secured to a gas line header which may enter the sump through the sidewall.

In this embodiment, the mechanical aeration means may be provided with a semi-circular blank to prevent discharge of aerated mixture toward the common wall. By limiting the direction of discharge from the mechanical aerator and displacing the sump toward the settling tank side of the aeration compartment, strong circulation is induced which sweeps the sloping bottom wall clean while the turbulence at the lowest point in the aeration compartment is effective to keep solids in suspension and substantially prevents accumulation of solids in the bottom of the aeration compartment.

The sump, with gas disperser position therein, operates as a confined space having communication with the main body of liquid only through the open top thereof. In such a sump, the air introduced through the disperser is mixed with liquid which enters through the top, i.e., the only open portion of the confined space, is mixed to form an air-liquid mixture in said space, and the mixture flows therefrom upwardly countercurrent to the entering liquid to impose hydraulic shearing forces on the air bubbles in the mixture. This countercurrent flow creates a turbulence at the low point in the aeration compartment which also distributes the solids entering the sump and entrains them in the upwardly flowing mixture so that they continue to be solids suspended in the main body of circulating mixed liquor in the aeration compartment.

When the scraper is adapted for travel at a rate of 2 feet per minute in a settling tank having a length of 12 feet, sludge settling adjacent the slot or second communication link between the compartments will be moved out once in each six-minute period.

When sewage is to be treated at a design rate of 10,000 gallons of raw sewage a day, the volume of mixed liquor being held under aeration, i.e., in the aeration compartment, may be of the order of 200 cubic feet with an average loading rate of between 85 and 100 pounds of B.O.D. per 1000 cubic feet of aeration tank volume per day. Discharge of mixed liquor to a setting compartment having a capacity of 1200 gallons is through baffled ports spaced along the common wall. Effluent separated in the final tank is discharged at a rate of 10,000 gallons per day, the effluent generally having less than 30 mg. per liter of B.O.D.

The above-detailed description of this invention has been given by way of illustration without any intention that the invention be limited to the exact conditions set forth. No unnecessary limitations should be understood, therefore, as modifications will be obvious to those skilled in the art.

I claim:

1. A method of treating aqueous waste material which comprises establishing side-by-side aeration and settling zones with a common boundary therebetween, the bottom of said settling zone being positioned elevationally higher than the bottom of said aeration zone, said zones communicating in at least two locations through said common boundary below the normal liquid levels prevailing in said zones, the first of said communications being in the upper portion of said zones and providing for transfer of liquid from the aeration zone to the settling zone, the said second of said communications being an unobstructed slot-like area immediately adjacent the bottom of said settling zone at the lowermost portion thereof and providing for transfer of fluid from said settling zone into an area of said aeration zone elevationally higher than the bottom of said zone, which lowermost portion is adjacent the bottom of said common boundary, establishing a mixture of waste material and sludge in said aeration zone, mixing atmospheric air with said mixture of waste material and sludge to provide an aerated mixture, flowing aerated mixture from said aeration zone to said settling zone through the first of said communications and moving the sludge which settles at the bottom of said settling zone through the second of said communications into said elevationally higher area of said aeration zone intermittently on a preestablished time cycle in response to a positive thrust biased in the direction of said aeration tank exerted by means moving longitudinally in said slot-like communication area whereby the sludge settling adjacent any portion of said slot-like area is individually swept beneath said common wall into said eration zone, and removing clarified effluent from the upper portion of said settling zone.

2. The method according to claim 1 wherein the aqueous waste material is sewage.

3. The method according to claim 1 wherein the movement of sludge is enhanced by pneumatic force acting in conjunction with the second of said communications.

4. The method according to claim 1 wherein the aeration of liquid in said aeration zone is a combination of mechanical mixing in the upper portion of the liquid in said zone and air dispersion means operating in a confined space communicating with the liquid in the bottom portion of said aeration zone only through the open top of said space whereby the air will mingle with liquid which enters through said open top of said confined space, forms an air-liquid mixture in said space, and flows therefrom in countercurrent contact with said entering liquid to impose hydraulic shearing forces on the air bubbles in said air-liquid mixture.

5. A method of treating aqueous waste material which comprises establishing side-by-side aeration and settling zones with a common boundary therebetween, the bottom of said settling zone being positioned elevationally higher than the bottom of said aeration zone, said zones communicating in at least two locations through said common boundary below the normal liquid levels prevailing in said zones, the first of said communications being in the upper portions of said zones and providing for transfer of liquid from the aeration zone to the settling zone, the said second of said communications being an unobstructed slot-like area immediately adjacent the bottom of said settling zone at the lowermost portion thereof and providing for transfer of fluid from said settling zone into said aeration zone, which lowermost portion is adjacent the bottom of said common boundary, establishing a mixture of waste material and sludge in said aeration zone, mechanically mixing atmospheric air with said mixture of waste material and sludge to provide an aerated mixture, flowing aerated mixture from said aeration zone to said settling zone through the first of said communications and moving the sludge which settles at the bottom of said settling zone through the second of said communications into said elevationally higher area of said aeration zone, intermittently on a preestablished time cycle in response to a positive thrust biased in the direction of said aeration tank exerted my means moving longitudinally in said slot-like communication area whereby the sludge settling adjacent any portion of said slot-like area is individually swept beneath said common wall into said aeration zone, wasting sludge in excess of that required to control the concentration of solids in said aeration zone and removing clarified effluent from the upper portion of said settling zone.

6. The method according to claim 5 wherein the first of said communications follows a circuitous path due to baffling at the aeration zone side thereof.

7. The method according to claim 5 wherein the predetermined period is at least once in each thirty-minute period.

8. The method according to claim 5 wherein the predetermined period is at least once in each fifteen-minute period.

References Cited

UNITED STATES PATENTS

| | | | |
|---|---|---|---|
| 2,090,384 | 8/1937 | Durdin | 210—197 |
| 3,058,908 | 10/1962 | Morgan | 210—15 |

FOREIGN PATENTS 941,857 11/1963 Great Britain.

MICHAEL E. ROGERS, *Primary Examiner.*

U.S. Cl. X.R.

210—15, 195, 221